R. G. CLARK.
TRANSMISSION GEARING.
APPLICATION FILED NOV. 27, 1915.

1,193,874.

Patented Aug. 8, 1916.

Witness
Alex Currie

Inventor
Robert G. Clark
By his Attorney
Lewis J. Doolittle

UNITED STATES PATENT OFFICE.

ROBERT G. CLARK, OF NEW YORK, N. Y., ASSIGNOR TO WILLIS H. SIMPSON, OF EAST ORANGE, NEW JERSEY.

TRANSMISSION-GEARING.

1,193,874.      Specification of Letters Patent.      Patented Aug. 8, 1916.

Application filed November 27, 1915. Serial No. 63,720.

*To all whom it may concern:*

Be it known that I, ROBERT G. CLARK, a citizen of the United States, and resident of the city of New York, borough of Brooklyn, county of Kings, and State of New York, have invented certain new and useful Improvements in Transmission-Gearing, of which the following is a specification.

This invention relates to a variable speed transmission gearing intended more especially for use in connection with the power mechanism of motor driven vehicles, although its application is not limited to this type of power mechanism.

The invention has for an object the provision of a simplified means for operatively engaging the desired members of the transmission mechanism.

For further comprehension of the invention reference will be had to the following description, taken in connection with the accompanying drawings illustrating an embodiment of the invention, and to the appended claims in which the novel features of the invention are more particularly set forth.

Figure 1:
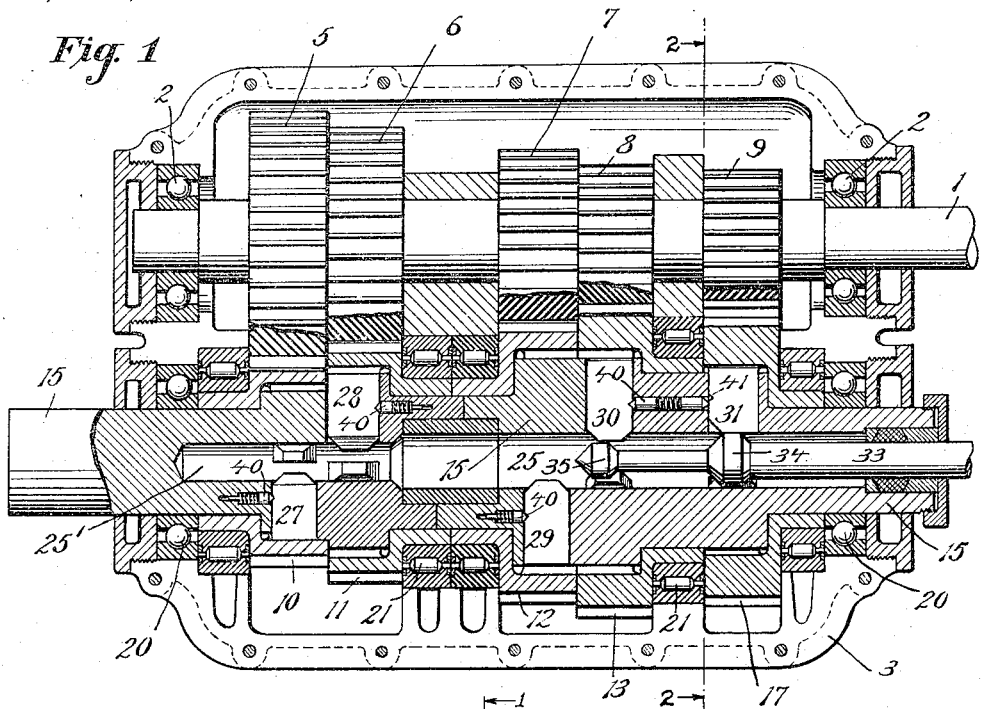
Figure 2:
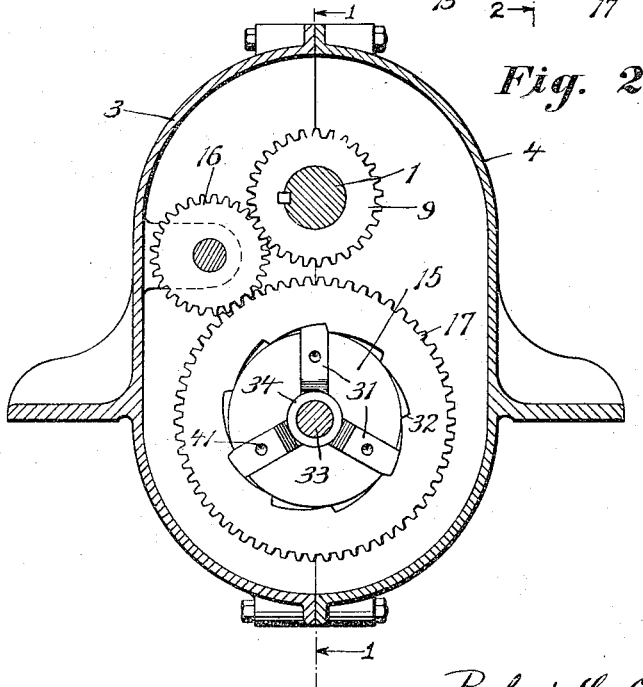

Figure 1 is a sectional plan view of a transmission gearing, the view being taken on the line 1—1 of Fig. 2. Fig. 2 is a transverse section on the line 2—2 of Fig. 1.

In the drawings 1 indicates the engine or motor shaft, which may be supported in bearings 2 on the gear casing, here shown as comprising two halves, 3 and 4, respectively.

Shaft 1 carries a series of gears of varying diameters attached thereto, there being five of these gears in the arrangement shown which are numbered respectively 5, 6, 7, 8 and 9. Of these gears all but the gear 9 intermesh directly with complementary gears 10, 11, 12 and 13 on a driving member 15 which transmits power to the part to be driven, the gear 9 meshing with an intermediate idler gear 16, suitably mounted in the gear casing, which meshes in turn with a gear 17 on the driving member 15. The corresponding gears are always in mesh, the gears on the driving member being loose thereon, the complementary gears forming a normally inoperative connection between the engine shaft and driving member, this invention having more especial reference to the means for operatively connecting any desired one of the gears on the engine shaft to the latter.

The driving member 15 is suitably supported in bearings 20 on the gear casing and may, as shown, be conveniently divided into a number of sections connected together in any suitable manner, while the gears thereon may be supported by intermediate bearings 21 on the casing.

Extending through the driving member is a central opening 25, having a portion 25' of reduced diameter, while a number of sliding pawls are positioned in radial slots in the driving member there being preferably a plurality of these pawls for each gear the pawls for the respective gears 10, 11, 12, 13 and 17 being numbered 27, 28, 29, 30 and 31. These pawls are positioned so as to engage ratchet teeth 32 on the inner peripheral surfaces of the hollowed-out gears when moved outwardly in the slots and to project at their inner ends slightly into the central opening 25, 25' when moved inwardly in the slots.

The inner ends of the pawls are adapted to be engaged by an operating member 33 slidable in the central opening in the driving member and having a pair of cam shaped parts or enlargements 34 and 35 of circular outline in end view thereon, the cam 35 being of smaller radial dimension than the cam 34 and fitting snugly in the portion 25' of the central opening (which is contiguous to the gears 10 and 11) while the cam 34 fits snugly in the part 25 of the central opening (which is contiguous to the gears 12, 13 and 17). The part 25 of the central opening is of sufficiently larger diameter than the part 25' that the cam 35 will move freely past the ends of pawls 29, 30 and 31 which project into the portion 25.

The pawls are normally yieldingly retained in their innermost positions by suitable means as the spring pressed detent pins 40 with cone-shaped projecting ends positioned in the driving member which engage in cone-shaped notches 41 in the pawls.

In the operation of the device the operating member 33 is moved (by any suitable means not shown) longitudinally in the opening 25 to cause the pawls of one of the gears to be engaged by one of the cams 34, 35 and moved outwardly to engagement with the ratchet teeth of the gear thus locking the gear to the driving member. In the position shown in the drawings cam 34 is engaging the pawls 31 of gear 17 and the reverse gear is therefore "in clutch." To reach this position, cam 35 has moved freely under the pawls 29 and 31 of gears 12 and 13. As the operating member is moved to the left the pawls 30 and 29 of gears 13 and 12 are engaged successively by cam 34 and finally the pawls 28 and 27 of gears 11 and 10 are engaged successively by cam 35.

The above described arrangement of parts, it will be noted, provides for a comparatively small travel of the operating member to throw the different gears into clutch.

As shown in Fig. 2 the engaging fans of the pawls and ratchet teeth 32 are preferably somewhat cammed in order to cause the pawls to be moved inwardly by the relative movement of the gear when the operating cam has disengaged from the pawl and another gear has been thrown in clutch; the cams 34 and 35 while in position under the pawls holding the cammed faces of the pawls and gears in positive engagement.

I claim:

1. In a transmission gearing, in combination, a motor shaft, a driving member, a plurality of sets of gears of varying diameters forming a normally inoperative connection between said motor shaft and driving member, the gears of each set being always in mesh, a plurality of devices adapted to establish operative connections between said gears and driving member, and an operating member having a plurality of parts adapted to operate the said devices, one of said parts being adapted to operate certain of said devices and to move freely past the devices engaged by the other part.

2. In a transmission gearing, in combination, a motor shaft, a driving member, a plurality of sets of gears of varying diameters forming a normally inoperative connection between said motor shaft and driving member, the gears of each set being always in mesh, a plurality of sliding pawls adapted to establish operative connections between said gears and driving member, and an operating member for said pawls, said operating member having a plurality of cam parts one of which is adapted to operate certain of said pawls and to move freely past the other pawls.

3. In a transmission gearing, in combination, a motor shaft, a plurality of gears of varying diameters fixed on said shaft, a driving member, a plurality of complementary gears loose upon said driving member, the corresponding gears on the motor shaft and driving member being always in mesh, radially slidable pawls carried by the driving member and adapted to operatively engage the gears thereon, and a slidably mounted operating member having a plurality of cam parts thereon adapted to operate said pawls, one of said parts being adapted to operate certain of said pawls and to slide freely past the other pawls.

4. In a transmission gearing, in combination, a motor shaft, a plurality of gears of varying diameters fixed on said shaft, a driving member, a plurality of complementary gears loose on said driving member, the corresponding gears on the motor shaft and driving member being always in mesh, radially slidable pawls carried by the driving member and adapted to operatively engage the gears thereon, and an operating member mounted centrally of said driving member to slide therein, such operating member having a plurality of cam parts of different radial dimensions adapted to operate different ones of said pawls.

5. In a transmission gearing, in combination, a motor shaft, a plurality of gears of varying diameters fixed on said shaft, a driving member, a plurality of complementary gears loose on said driving member, the corresponding gears on the motor shaft and driving member being always in mesh, radially slidable pawls carried by the driving member and adapted to operatively engage the gears thereon, means yieldingly retaining said pawls in inoperative position and an operating member mounted centrally of said driving member to slide therein, such operating member having a plurality of cam parts of different radial dimensions adapted to operate different ones of said pawls.

6. In a transmission gearing, in combination, a motor shaft, a plurality of gears of different diameter fixed thereon, a driving member having a central opening a portion of which is of reduced diameter, a plurality of complementary gears loose thereon, the corresponding gears on the motor shaft and driving member being always in mesh, radially slidable pawls carried by the driving member and adapted to operatively engage the gears thereon, and an operating member slidable in said central opening and having a pair of cams thereon one of which fits snugly in the reduced portion of the said central opening and the other of which fits snugly in the larger portion of the said central opening.

7. In a transmission gearing, in combination, a motor shaft, a driving member, a plurality of sets of gears of varying diameter forming a normally inoperative connection between said motor shaft and driving member, the gears of each set being always in mesh, a plurality of sliding pawls adapted to establish operative connections between said gears and driving member, and an operating member provided with a plurality of cams of different sizes adapted to operate and hold said pawls in positive engagement to operatively connect one of said sets of gears and said driving member.

8. In a transmission gearing, in combination, a motor shaft, a plurality of gears of different diameter fixed thereon, a driving member having a central opening a portion of which is of reduced diameter, a plurality of complementary gears loose thereon, the corresponding gears on the motor shaft and driving member being always in mesh, radially slidable pawls carried by the operating member and adapted to operatively engage the gears thereon, the engaging faces of the pawls and gears being cammed, means yieldingly retaining said pawls in inoperative position, and an operating member slidable in said central opening and having a pair of cams thereon one of which fits snugly in the reduced portion of said central opening and the other of which fits snugly in the larger portion of said central opening, the respective cams being adapted to engage different ones of said pawls to move the latter into operative relation with the gears on the driving member.

Signed at the city of New York, in the county and State of New York, this 23d day of November, 1915.

ROBERT G. CLARK.

Copies of this patent may be obtained for five cents each, by addressing the "Commissioner of Patents, Washington, D. C."